(12) United States Patent
Huang et al.

(10) Patent No.: US 9,130,219 B1
(45) Date of Patent: Sep. 8, 2015

(54) METHOD OF MAKING REDOX MATERIALS FOR SOLID OXIDE REDOX FLOW BATTERY

(71) Applicant: University of South Carolina, Columbia, SC (US)

(72) Inventors: Kevin Huang, Export, PA (US); Xue Li, Columbia, SC (US)

(73) Assignee: University of South Carolina, Columbia, SC (US)

( * ) Notice: Subject to any disclaimer, the term of this patent is extended or adjusted under 35 U.S.C. 154(b) by 307 days.

(21) Appl. No.: 13/649,827

(22) Filed: Oct. 11, 2012

Related U.S. Application Data

(60) Provisional application No. 61/627,362, filed on Oct. 11, 2011.

(51) Int. Cl.
*H02J 7/00* (2006.01)
*H01M 8/20* (2006.01)
*H01M 8/18* (2006.01)

(52) U.S. Cl.
CPC ............... *H01M 8/20* (2013.01); *H01M 8/188* (2013.01)

(58) Field of Classification Search
CPC ......... H01G 11/02; H01M 8/188; H01M 8/20
USPC .......... 320/110, 127, 128, 147, 166; 429/209, 429/405
See application file for complete search history.

(56) References Cited

U.S. PATENT DOCUMENTS

| | | | |
|---|---|---|---|
| 5,492,777 A | 2/1996 | Isenberg et al. | |
| 5,656,390 A * | 8/1997 | Kageyama et al. | 429/105 |
| 6,103,393 A * | 8/2000 | Kodas et al. | 428/570 |
| 7,741,559 B2 * | 6/2010 | Kurihara et al. | 136/263 |
| 8,338,025 B2 * | 12/2012 | Lu et al. | 429/209 |
| 8,343,572 B2 * | 1/2013 | Varade et al. | 427/78 |
| 8,541,138 B2 * | 9/2013 | Kazacos et al. | 429/231.5 |
| 8,709,972 B2 * | 4/2014 | Istvan et al. | 502/425 |
| 8,722,227 B2 * | 5/2014 | Chiang et al. | 429/105 |
| 2008/0113257 A1 * | 5/2008 | Hampden-Smith et al. | 429/42 |
| 2012/0034520 A1 * | 2/2012 | Lu et al. | 429/209 |
| 2012/0058396 A1 * | 3/2012 | Lu et al. | 429/221 |
| 2012/0077095 A1 * | 3/2012 | Roumi et al. | 429/405 |
| 2012/0135278 A1 * | 5/2012 | Yoshie et al. | 429/7 |
| 2013/0189592 A1 * | 7/2013 | Roumi et al. | 429/406 |
| 2014/0322628 A1 * | 10/2014 | Umeda et al. | 429/492 |
| 2014/0335440 A1 * | 11/2014 | Kunita et al. | 429/492 |
| 2014/0363747 A1 * | 12/2014 | Evans et al. | 429/409 |

OTHER PUBLICATIONS

Alotto et al.; 'Redox Flow Batteries for large scale energy storage'; Publication Year: 2012; Energy Conference and Exhibition (ENERGYCON), 2012 IEEE International; pp. 293-298.*

(Continued)

*Primary Examiner* — Helen Rossoshek
(74) *Attorney, Agent, or Firm* — Dority & Manning, P.A.

(57) ABSTRACT

A method of forming a redox couple bed for a solid oxide redox flow battery is described. The method includes mixing together carbon and metal oxide. The method further includes heating the mixture while feeding an inert gas into the mixture, the inert gas removing gas products CO and CO2. The metal oxide is reduced to a metal resulting in formation of a redox couple bed.

19 Claims, 3 Drawing Sheets

(56) References Cited

OTHER PUBLICATIONS

Tsuda et al., "Development of intermittent redox flow battery for PV system"; Publication Year: 1994; Photovoltaic Energy Conversion, 1994., Conference Record of the Twenty Fourth. IEEE Photovoltaic Specialists Conference—1994, 1994 IEEE First World Conference on; vol. 1; pp. 946-949 vol. 1.*

U.S. Appl. No. 13/632,694, filed Oct. 1, 2012, Huang et al., "Solid Oxide Redox Flow Battery".

* cited by examiner

METHOD OF MAKING REDOX MATERIALS FOR SOLID OXIDE REDOX FLOW BATTERY

BACKGROUND

Establishing an efficient and reliable transmission and distribution system for electrical energy produced from renewable resources as well as conventional power plants requires successful development and deployment of efficient electricity storage technology. Conventional rechargeable batteries are by far the most common form of electricity storage devices. Represented by lithium ion battery technology, this class of rechargeable batteries has been broadly used in small to medium scale electrical storage applications. Attempts to use this low-temperature battery technology for large scale grid energy storage, however, have so far proven difficult, primarily due to the concerns of safety and slow rate of rechargeability. On the other hand, high-temperature rechargeable battery technology, represented by sodium sulfur battery technology, is particularly capable of fast rechargeability, but faces challenges of inability of thermal cycling, high manufacturing cost and corrosion-shortened cycle life.

U.S. patent application Ser. No. 13/632,694, incorporated by reference herein, describes a high-performance, low-cost and safe rechargeable battery system to satisfy applications in grid energy storage. However, production of redox materials for use with such batteries is very energy intensive.

As such, a need exists for an improved method for creating battery redox materials.

SUMMARY

In certain embodiments of the present disclosure a method of forming a redox couple bed for a solid oxide redox flow battery is described. The method includes mixing together carbon and metal oxide. The method further includes heating the mixture while feeding an inert gas into the mixture, the inert gas removing gas products CO and CO2. The metal oxide is reduced to a metal resulting in formation of a redox couple bed.

Other exemplary implementations of the present disclosure are directed to systems and apparatus for forming and utilizing a redox couple bed as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures in which.

DETAILED DESCRIPTION

Reference will now be made in detail to embodiments of the disclosed subject matter, one or more examples of which are set forth below. Each example is provided by way of explanation of the subject matter, not limitation of the subject matter. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

Figure 1:
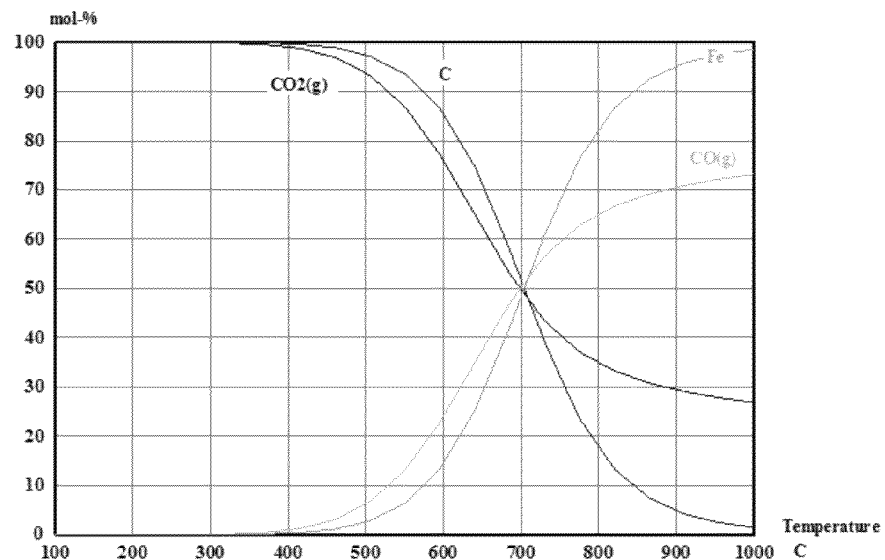
FIG. 1 illustrates equilibrium compositions of C—$Fe_2O_3$ system as a function of temperature in accordance with certain embodiments of the present disclosure.

The present disclosure describes methods of making redox materials for solid oxide redox flow batteries. The principle of the disclosed chemical approach to synthesize redox stable materials is based on a chemical reaction between carbon and $MeO_x$ as follows:

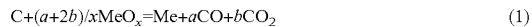

$$C + (a+2b)/x MeO_x = Me + aCO + bCO_2 \quad (1)$$

where Me is a metal (e.g., Fe, Mn, Co, or the like); x is the stoichiometric coefficient of oxygen; a and b are equilibrium molar fractions of CO and $CO_2$, respectively, dependent of temperature. FIG. 1 shows the gas-phase equilibrium compositions of reaction (1) using Fe as an example as a function of temperature. The initial molar ratio of C to $Fe_2O_3$ is kept to 1. It is evident that the degree of reduction of $Fe_2O_3$ to Fe increases with temperature. At about 1000° C., almost all $Fe_2O_3$ can be reduced to Fe with a smaller fraction of carbon left. The gas composition at about 1000° C. contains only CO and $CO_2$ in a ratio of close to about 73.2:26.8.

A typical synthesis procedure can be described as follows. Powders of carbon or graphite are intimately mixed with $Fe_2O_3$ and $ZrO_2$ in a ratio as described herein. The molar ratio of C:$Fe_2O_3$:$ZrO_2$ ranges from about 1:1:0.05 to about 1:0.30:0.015 to ensure a full reduction of $Fe_2O_3$ to Fe. The powder mixture is then placed into a tubular furnace. To facilitate the removal of gas products CO and $CO_2$, an inert gas $N_2$ is used to flush continuously at a flow rate of about 100-500 sccm over the sample surface during the reduction process. The synthesis temperature is about 1000° C. to about 1200° C., at which one to ten hours is usually held. Due to the evolution of gaseous phases CO and $CO_2$, a unique porous structure that can facilitate the gas diffusion and surface reaction during battery operation can be obtained.

The ratio between C and $Fe_2O_3$ is important to achieve a fully reduced Fe. Excess C may be preferable in light of battery performance since the residue C can continue to reaction with the reaction gas $H_2O$ or $CO_2$ of the battery to produce CO and $H_2$ for the discharge cycle.

Alternatively, the C/$Fe_2O_3$/$ZrO_2$ mixture can also be used as the redox material to be directly assembled into the solid oxide redox flow battery (SORFB). The aforementioned chemical reduction of $Fe_2O_3$ can also take place in the battery by flowing with $N_2$ during initial heating up process. The unreacted carbon can further react with the battery reaction gas such as $H_2O$, $CO_2$ and a mixture of them during the battery operation to produce extra $H_2$ and CO for the discharge cycle.

The degree of reduction of $Fe_2O_3$ by C can be monitored in-situ by the SORFB using the EMF technique. The measured EMF, directly related to the partial pressure of oxygen in the gas phase, is then compared with the thermodynamic analysis to confirm the equilibrium phase composition existent in the redox material. Once the measured EMF matches with the thermodynamic calculation showing full reduction of $Fe_2O_3$ to Fe, the battery is then ready for electrical cycles.

As discussed previously, the redox material described herein can be utilized with solid oxide redox flow batteries such as those described in U.S. patent application Ser. No. 13/632,694, incorporated by reference herein.

Such batteries include a cell structure having a solid oxide electrochemical cell and a redox couple bed. The batteries can operate between fuel cell and electrolysis modes of a solid oxide electrochemical cell along with an "in-battery" $H_2$ generation and storage unit to realize charge/discharge characteristics. The batteries can include a solid oxide electrochemical cell and a redox couple bed (RCB) utilizing the method described herein, both of which can be operated at elevated temperatures. The solid oxide electrochemical cell is a conventional solid oxide fuel cell (SOFC).

The SOFC includes an electrolyte (such as a $Y_2O_3$-doped $ZrO_2$, or the like). The electrolyte conducts oxygen ions with the electronic conductivity being kept as low as possible to prevent losses from leakage currents. The high operating temperatures of SOFCs allow the kinetics of oxygen ion transport to be sufficient for good performance. Other suitable electrolyte materials can include yttria stabilized zirconia, scandia stabilized zirconia, strontium and magnesium doped lanthanum gallate and gadolinium and samarium doped cerin or the like.

The SOFC further includes an anode (such as a Ni—$ZrO_2$ cermet or the like). The anode layer can be porous and possess predominant electronic conductivity. Suitable materials can include a cermet made up of nickel combined with the ceramic material that is used for the electrolyte in that particular cell, typically YSZ (yttria stabilized zirconia), or the like. Additionally, the SOFC includes a cathode (such as a $La_{0.6}Sr_{0.4}Fe_{0.8}Co_{0.2}O_3$, or the like) and an interconnect (such as a doped-$LaCrO_3$, or the like). The interconnect can be either a metallic or ceramic layer that sits between each individual cell. Its purpose is to connect each cell in series, so that the electricity each cell generates can be combined.

The RCB formed in accordance with the present disclosure can hold a porous nanostructure made of a metal (Me) and its metal oxide ($MeO_x$) derivative. The discharging cycle starts with the introduction of steam into the RCB. The interaction between steam and Me produces $H_2$ via the following reaction $$xH_2O + Me = xH_2 + MeO_x \quad (2)$$

The formed $H_2$ continues flowing towards the solid oxide electrochemical cell operating under the SOFC mode where it is electrochemically oxidized to generate electricity and steam via the following electrode reaction $$xH_2 + xO^{2-} = xH_2O + 2xe^- \quad (3)$$

When all of the active Me is chemically converted to $MeO_x$, the discharging process will stop. Until $MeO_x$ is reduced back to Me, the next discharging cycle cannot commence. This situation will require the charging cycle.

The purpose of the charging cycle is to convert $MeO_x$ to Me. One readily available method is to operate a solid oxide electrochemical cell under the electrolysis mode (also known as solid oxide electrolysis cell or SOEC) to generate $H_2$ from $H_2O$; the produced $H_2$ can then be used to reduce $MeO_x$ to Me.

Therefore, a charging cycle of the battery cell starts with feeding steam from the side of SOEC where $H_2O$ is electrochemically split into $H_2$ by the following electrode reaction $$xH_2O + 2xe^- = xH_2 + xO^{2-} \quad (4)$$

The generated $H_2$ continues flowing towards the RCB where $MeO_x$ is reduced into Me by chemical reaction $$xH_2 + MeO_x = xH_2O + Me \quad (5)$$

When all the $MeO_x$ is reduced to Me by the SOEC-$H_2$, the charging cycle is completed. The freshly reduced active Me is then ready for the next discharging cycle.

At the air electrode, oxygen reduction and evolution take place as follows during the discharge and charge cycles.

$$1/2 O_2 + 2e^- \underset{charge}{\overset{discharge}{\rightleftharpoons}} O^{2-} \quad (6)$$

By combining reactions (2)-(6), the overall chemical reaction of the SORFB then becomes:

$$Me + \frac{x}{2}O_2 \underset{charge}{\overset{discharge}{\rightleftharpoons}} MeO_x \quad (7)$$

In essence, reaction (7) indicates the battery as a "metal-air" battery. Different from conventional low-temperature metal-air batteries such as Li-air and Zn-air, however, is the type of electrolyte utilized. The described battery uses a solid $O^{2-}$-electrolyte whereas other "metal-air" batteries use a liquid $H^+$-electrolyte. More electrons involved in the charge-transfer process permit the SORFB to achieve higher storage-capacity at a higher rate.

As is apparent, the overall electrical cycle requires only steam as the feedstock. It is important to point out that the unutilized $H_2$ or $H_2O$ should also be recycled with the incoming steam to improve the "fuel" efficiency and performance stability. A pump created dynamic flow of steam can avoid mass-transport limitation and therefore stabilize the battery performance.

The present disclosure can be better understood with reference to the following examples.

EXAMPLES

Solid Oxide Redox Flow Battery Assembly

Figure 2:
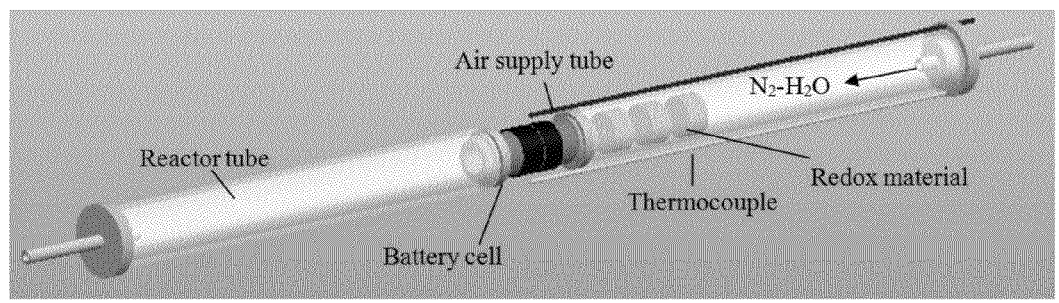
FIG. 2 illustrates a single battery assembly with an integrated redox-cycle unit in accordance with certain embodiments of the present disclosure.

The redox reactor containing carbon-incorporated redox material is assembled according to FIG. 2 in the form of pellets or slabs. The amount of Fe loading determines the capacity of the battery.

Figure 3:
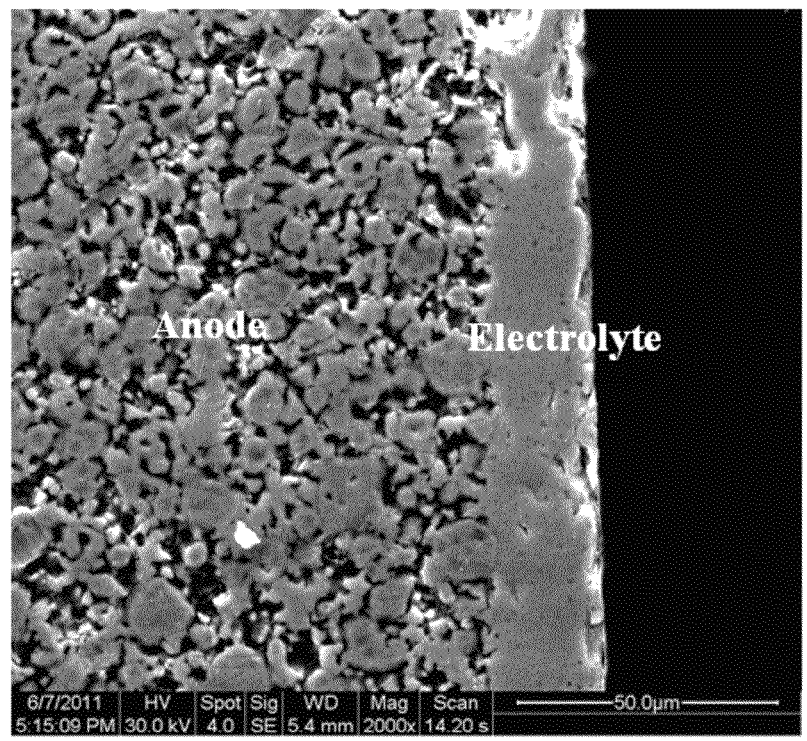
FIG. 3 illustrates the microstructure of an anode-supported tubular SOEC in accordance with certain aspects of the present disclosure.
Figure 4:
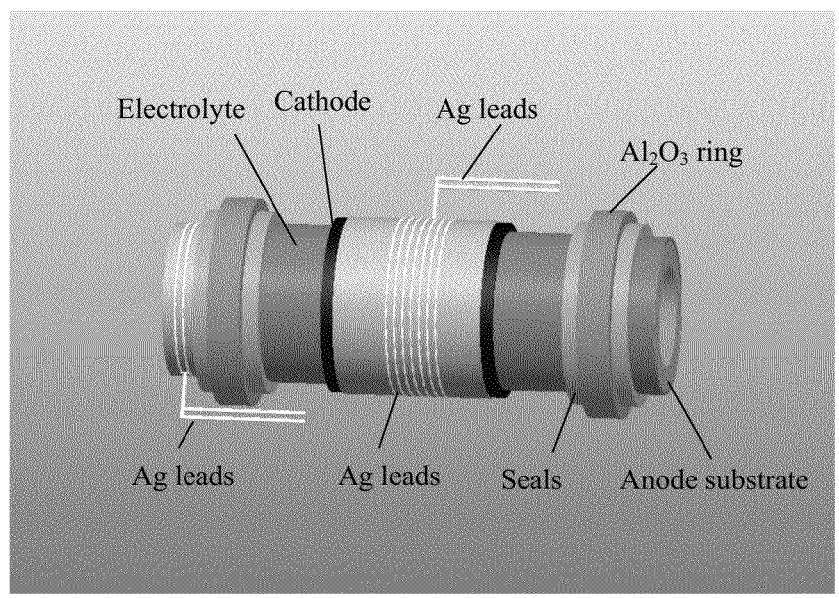
FIG. 4 illustrates a single battery cell subassembly in accordance with certain aspects of the present disclosure.
Figure 5:
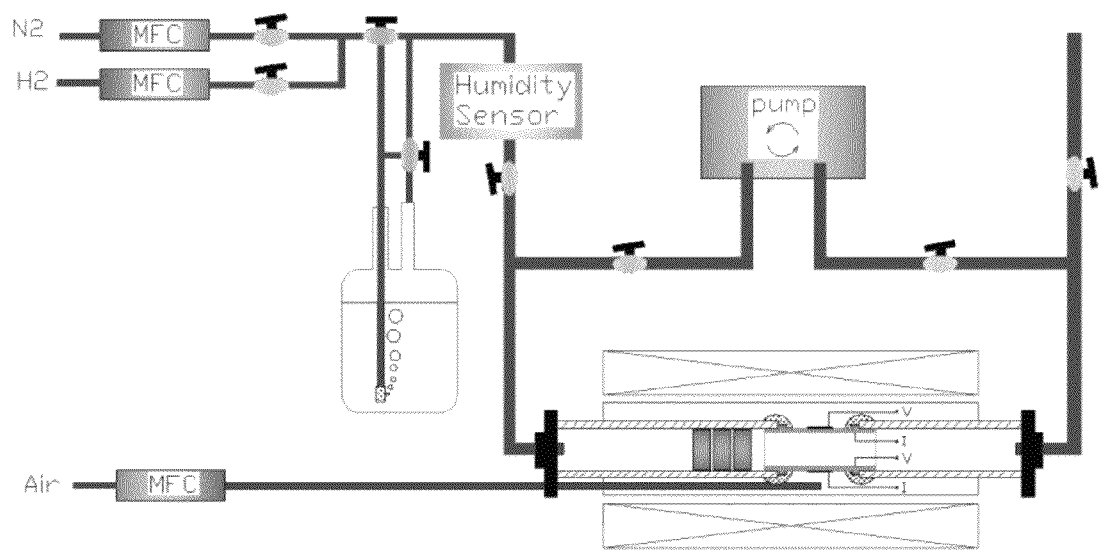
FIG. 5 illustrates a flow block diagram of test configuration for the battery in accordance with certain aspects of the present disclosure.

A commercially available anode-supported tubular SOFC (Ni-YSZ/YSZ, CoorsTek) (10 mm in OD, 1.25 mm in wall thickness and 40 mm in length) was used as the core component solid oxide electrochemical cell (SOEC) in the battery. The resultant effective cell surface area is 4.78 $cm^2$. A cross-sectional view of the anode/electrolyte microstructure after reduction is shown in FIG. 3, which indicates an approximately 25 μm-thick YSZ electrolyte on the anode with a reasonably good porosity and pore size. The composite cathode ink made up of GDC ($Ce_{0.8}Gd_{0.2}O_2$) and LSCF ($La_{0.6}Sr_{0.4}Co_{0.2}Fe_{0.8}O_{3-\delta}$) (LSCFGDC-1, Fuel Cell Materials) was applied to the outer surface of the cell and calcined at 1050° C. for 1 h in open air. The currents were collected by silver wires attached on the outer surface of the cathode and one end of the anode as shown in FIG. 4. To ensure good electrical contacts, a layer of silver prepared from silver paste (C8829, Heraeus) was coated prior to attaching the silver wires. Served as the transitional part, two Al2O3 rings were attached to the two ends of the cell. The battery cell was finally cement-mounted onto two long Al2O3 tubes in which Fe—$ZrO_2$ pellets were installed close to the inlet end of the battery cell. The volume of the enclosed loop in the fabricated battery cell is approximately 81.5 cm$^3$. FIG. 5 shows a schematic view of the assembled battery cell.

Solid Oxide Redox Flow Battery Testing

The assembled battery was tested in a test rig shown in FIG. 5. Overall, it is formed from three major components: the battery cell, circulating pump, and a set of toggle valves. By turning off and on certain toggle valves, a closed-loop circulation can be created by the pump. The flow rates of all the gases used ($N_2$, $H_2$ and Air) were controlled by the mass flow controllers (MFCs). The desirable $H_2O$ contents were obtained by passing the carrier gas $N_2$ or $H_2$ through a bubbler heated to a fixed temperature. An on-line humidity sensor (Vaisala model 332) was deployed to measure the real-time steam content in the gas phase. To prevent condensation, all pipelines were heat-wrapped and kept at 150° C. A Solartron 1260/1287 Electrochemical System (not shown in FIG. 5) was employed to measure the electrical performance of the battery with software modules such as OCV (open circuit voltage)-t, impedance spectroscopy, potential-dynamic and galvanic square wave.

A typical characterization procedure can be described as follows. Pure $N_2$ is first used to purge the entire pipe system several times to remove any possible residual air in the circulation loop. The battery is then heated up to the target temperature of 600-800° C. with a ramp rate of 3° C./min and 200-sccm air and 90-sccm dry $H_2$ flowing outside and inside of the battery cell, respectively. During this period, the open-circuit voltage is constantly monitored while NiO in the anode of the SOEC is being reduced. After reaching 800° C., dry $H_2$ is switched to $N_2$, the carrier of $H_2O$, in the redox cycle unit where oxidation of Fe takes place, producing $H_2$ for the discharge cycle. At each $H_2O$ concentration, OCV-t, impedance spectroscopy, V-I characteristic and galvanic square wave are conducted in a closed-loop flow fashion before $H_2$ is introduced to reduce the oxidized Fe back to Fe for the next-round characterization. To ensure no $H_2$ is left in the pipeline, $H_2O$-bore $N_2$ is allowed to purge through for 1 minute (obviously some produced $H_2$ could be lost during the purge) before the measurement starts. Upon closed-loop circulation, the outlet and inlet toggle valves are sequentially shutoff, immediately followed by turning on the pump. The pump was set to a pre-calibrated flow rate of 90 sccm $N_2$-flow.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so further described in such appended claims.

What is claimed:

1. A solid oxide redox flow battery comprising:
a battery cell and redox material in fluid communication with one another, the redox material comprising a porous structure comprising a metal and carbon, the battery cell being configured to operate between a fuel cell mode and an electrolysis mode;
the redox material being configured to receive an inert gas during an initial heating process resulting in removal of gas products including CO and $CO_2$ and reduction of a metal oxide of the metal by the carbon according to the following reaction:

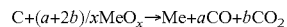

wherein
Me is the metal,
x is the stoichiometric coefficient of oxygen,
a and b are the equilibrium molar fractions of the CO and the $CO_2$, respectively;
the redox material being further configured to receive steam during the fuel cell mode resulting in oxidation of the metal to form the metal oxide and production of hydrogen, the hydrogen being capable of flowing to the battery cell, the battery cell being configured to electrochemically oxidize the hydrogen during the fuel cell mode to generate steam and electricity;
the redox material being further configured to receive hydrogen produced from the battery cell during the electrolysis mode resulting in reduction of the metal oxide to form the metal and recharge of the redox material.

2. The solid oxide redox flow battery as in claim 1, the battery cell comprising an electrolyte.

3. The solid oxide redox flow battery as in claim 2, wherein the electrolyte comprises yttria stabilized zirconia, scandia stabilized zirconia, strontium and magnesium doped lanthanum gallate and gadolinium, or samarium doped cerin.

4. The solid oxide redox flow battery as in claim 1, the battery cell comprising a porous anode.

5. The solid oxide redox flow battery as in claim 4, wherein the porous anode comprises a cermet.

6. The solid oxide redox flow battery as in claim 1, wherein the redox material comprises zirconium.

7. The solid oxide redox flow battery as in claim 1, wherein the inert gas comprises $N_2$.

8. The solid oxide redox flow battery as in claim 1, wherein the metal oxide comprises $Fe_2O_3$.

9. A method of forming a redox material for a solid oxide redox flow battery comprising:
mixing together a carbon material and a metal oxide to form a mixture; and
heating the mixture to a reaction temperature while feeding an inert gas to the mixture, the inert gas removing gas products of the reaction, the gas products comprising CO and $CO_2$, the metal oxide being reduced during the reaction to form a metal, the reaction resulting in formation of the redox material comprising the metal, the reaction comprising:

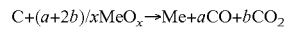

wherein
Me is the metal,
x is the stoichiometric coefficient of oxygen,
a and b are the equilibrium molar fractions of the CO and the $CO_2$, respectively.

10. The method as in claim 9, the mixture of the carbon material and the metal oxide comprising $ZrO_2$.

11. The method as in claim 9, wherein the redox material is positioned within the solid oxide redox flow battery, the method further comprising:
    oxidizing the metal of the redox material during a fuel cell mode cycle of the e battery to produce the metal oxide and hydrogen and to produce electricity at a cell of battery; and
    feeding hydrogen produced at the cell during an electrolysis mode of the battery to the redox material resulting in reduction of the metal oxide and recharge of the redox material.

12. The method as in claim 11, further comprising reacting unreacted carbon of the mixture during the fuel cell mode to produce additional hydrogen and CO.

13. The method as in claim 9, wherein the inert gas comprises $N_2$.

14. The method as in claim 9, wherein the metal oxide comprises $Fe_2O_3$.

15. The method as in claim 11, further comprising feeding steam to the redox material during the fuel cell mode cycle.

16. The method as in claim 9, wherein the molar ratio of carbon to metal oxide in the mixture ranges from about 1:1 to about 1:0.30.

17. The method as in claim 9, the mixture comprising iron oxide and zirconium oxide, wherein the molar ratio of carbon to iron oxide to $ZrO_2$ ranges from about 1:1:0.05 to about 1:0.30:0.015.

18. The method as in claim 9, wherein the degree of reduction of the metal oxide increases with temperature.

19. The method as in claim 9, wherein the reaction temperature is from about 1000° C. to about 1200° C.

* * * * *